S. GIOVANNINI.
MEANS FOR PROPELLING BOATS.
APPLICATION FILED JUNE 12, 1909.
957,550.
Patented May 10, 1910.
3 SHEETS—SHEET 1.
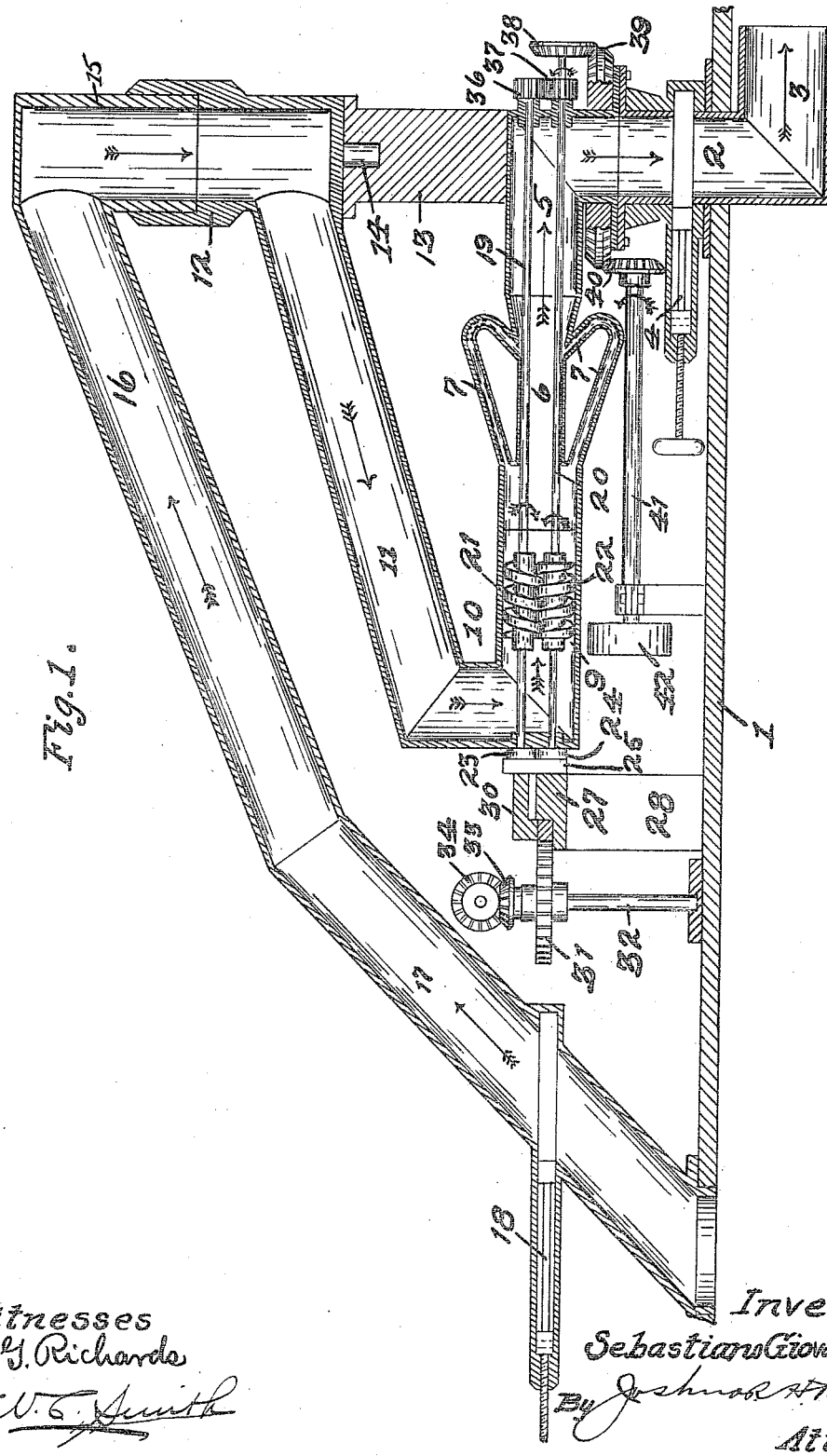
Witnesses
B. J. Richards
W. E. Smith
Inventor
Sebastiano Giovannini
By Joshua R. H. Potts
Attorney

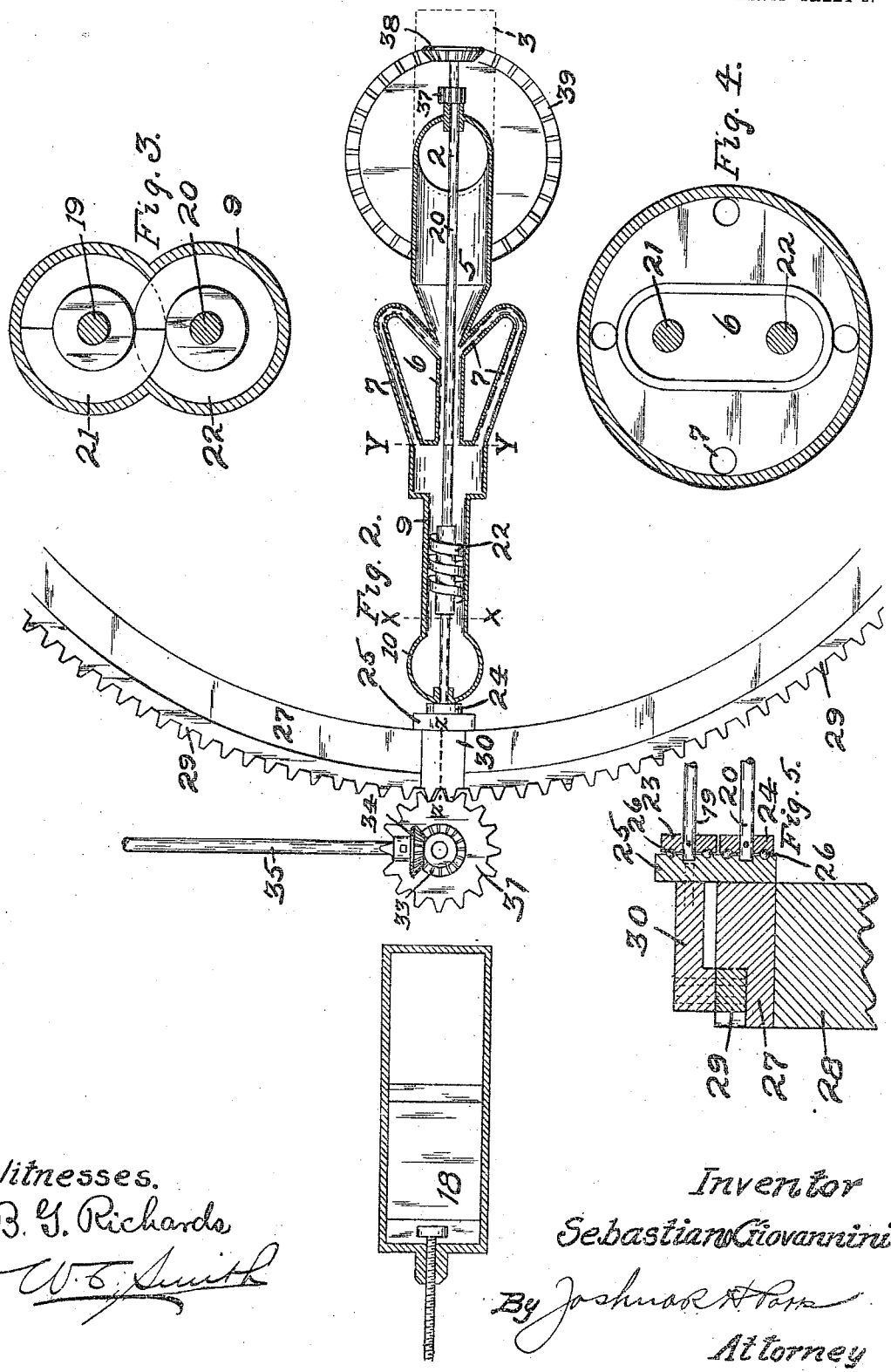

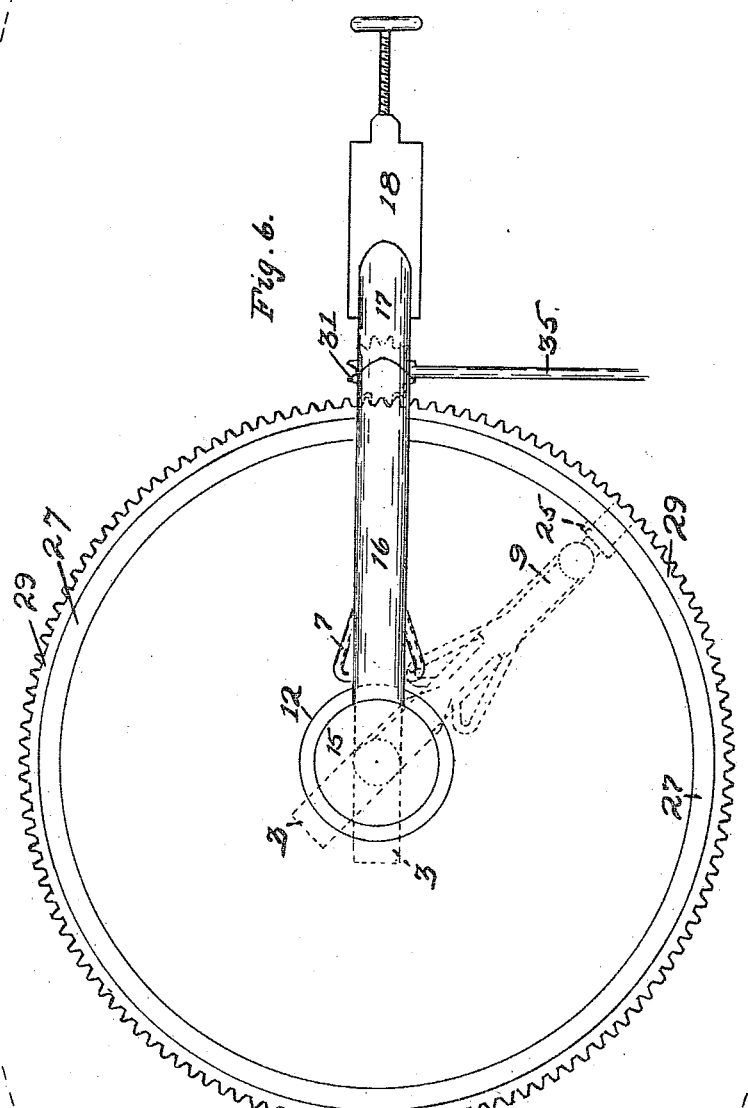

UNITED STATES PATENT OFFICE.

SEBASTIANO GIOVANNINI, OF CHICAGO, ILLINOIS.

MEANS FOR PROPELLING BOATS.

957,550. Specification of Letters Patent. Patented May 10, 1910.

Application filed June 12, 1909. Serial No. 501,782.

*To all whom it may concern:*

Be it known that I, SEBASTIANO GIOVANNINI, a subject of the King of Italy, residing at Chicago, county of Cook, and State of Illinois, have invented certain new and useful Improvements in Means for Propelling Boats, of which the following is a specification.

My invention relates to improved means for propelling boats and has for its objects the production of simple means for this purpose which may also be utilized for the steering of the boat.

In the drawings Figure 1 is a longitudinal section through apparatus embodying my invention; Fig. 2 is a horizontal section of Fig. 1; Fig. 3 is an enlarged section on line X—X of Fig. 2; Fig. 4 is an enlarged section on line Y—Y of Fig. 2; Fig. 5 is an enlarged section on line Z—Z of Fig. 2; and Fig. 6 is a top plan view of the apparatus on a reduced scale and indicating in dotted lines its position relatively to a boat.

Upon the bottom 1 of the boat or ship is pivoted a vertical pipe 2 provided with a substantially horizontal discharge pipe 3 located under the bottom of the boat. The pipe 2 is preferably provided with a gate 4 by means of which it may be closed, and communicates at its upper end with a substantially horizontal pipe 5 leading by way of a reduced pipe 6 and tortuous pipes 7 to an 8-shaped compartment 9. A pipe 10 leads from compartment 9 to a pipe 11 which leads to a head 12 which is pivoted to a pedestal 13 by means of a pivot pin 14, whose axis is in alinement with the axis of pipe 2. Head 12 is also pivoted in the same axis with the head 15 from which leads a pipe 16 to the pipe 17, communicating with the water under the bottom of the boat. A gate or valve 18 is preferably provided for closing the pipe 17 when desired and pipes 3, 2, 5, 10 and 11 and head 12 are all rigidly connected together.

Two substantially horizontal shafts 19 and 20 are mounted in suitable bearings in the pipes 5 and 6 and compartment 9. Shafts 19 and 20 carry the opposite and intermeshing screw threads 21 and 22 in compartment 9, which is made 8-shaped to closely fit the outside surface of said screws. Shafts 19 and 20 extend through the wall of pipe 10 where they are provided with end thrust plates 23 and 24 resting against an abutment 25. Ball bearings 26 are provided between plates 23 and 24 and abutment 25. Abutment 25 rests against the inner side of an annular ring 27, suitably supported by posts 28 from the bottom of the boat. The ring 27 carries an annular gear 29 loosely resting in an annular groove in the ring 27. Abutment 25 is attached to the gear 29 by means of an arm or support 30. A gear 31 meshes with the gear 29 and is adapted to rotate said gear 29 in its annular groove. The gear 31 is mounted on a shaft 32 carrying a bevel gear 33 meshing with a bevel gear 34 on the shaft 35, which is placed under the control of the pilot of the boat by any suitable means (not shown). The other ends of shafts 19 and 20 extend through the wall of pipe 5, where they are provided with intermeshing gears 36 and 37. Shaft 20 carries a bevel gear 38 meshing with a double bevel gear 39 loosely mounted around pipe 2. Gear 39 also meshes with a bevel gear 40 on a shaft 41 which is driven by the engine of the boat through the medium of pulley 42.

By this construction it will be seen that when the shafts 19 and 20 are rotated in the direction indicated by the arrows, a quantity of water will be imprisoned between the screw threads 21 and 22 and the walls of the jacket of compartment 9 and forcibly driven therethrough in the direction of the arrows in Fig. 1. It will be observed that this furnishes a positive and powerful means for forcing a continuous and constant stream of water through pipes 6, 7, 5, 2 and 3, thus avoiding the throb or pulsation of an intermittent stream. This will produce an unopposed reaction at the mouth of passage pipe 3, thus propelling the boat in the direction of the pivotal pipes. By means of gears 31 and 29, the pivotal pipes may be shifted to any desired position while in operation as indicated in dotted lines in Fig. 6, and thus the direction of the boat controlled. If the pivotal pipes are shifted to a position more than 90 degrees from that illustrated in Figs. 1 and 2, the boat may be backed and also steered in any desired direction.

While I have illustrated and described the preferred construction for carrying my invention into effect, this is capable of variation and modification without departing from the spirit of the invention. And therefore I do not wish to be limited to the exact construction set forth but wish to avail myself of such variations and modifications as come within the scope of the appended claim.

Having described my invention what I claim as new and desire to secure by Letters Patent is:

In means for propelling boats, the combination of a stationary tube communicating with the water on the exterior of the vessel and terminating in a vertically disposed head; a vertically disposed head communicating with and pivoted to said first mentioned head; a pipe leading outwardly from the axis of said pivoted head and communicating with an inwardly extending pipe, which latter communicates with a vertical pipe pivoted in the axis of the two first mentioned heads and having a substantially horizontal discharge beneath the bottom of the boat; means for forcing water through said pipes; and means for swinging the pivoted pipes to different positions, substantially as described.

In testimony whereof I have signed my name to this specification in the presence of two subscribing witnesses.

SEBASTIANO GIOVANNINI.

Witnesses:
HELEN F. LILLIS,
JOSHUA R. H. POTTS.